US010284078B1

(12) United States Patent
Knoedgen et al.

(10) Patent No.: US 10,284,078 B1
(45) Date of Patent: May 7, 2019

(54) APPARATUS AND METHOD FOR LIMITING ELECTROMAGNETIC INTERFERENCES IN A SWITCHING CONVERTER

(71) Applicant: Dialog Semiconductor (UK) Limited, London (GB)

(72) Inventors: Horst Knoedgen, Munich (DE); Christoph N. Nagl, Graz (AT); Nebojsa Jelaca, Graz (AT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/841,168

(22) Filed: Dec. 13, 2017

(51) Int. Cl.
| | |
|---|---|
| *H02M 3/335* | (2006.01) |
| *H02M 1/14* | (2006.01) |
| *H02M 1/34* | (2007.01) |
| *H02M 1/44* | (2007.01) |
| *H02M 1/32* | (2007.01) |

(52) U.S. Cl.
CPC ............ *H02M 1/44* (2013.01); *H02M 3/335* (2013.01)

(58) Field of Classification Search
CPC ......... H02M 3/33507; H02M 3/33538; H02M 1/14; H02M 1/34; H02M 1/44; H02M 1/32; G05F 1/613
See application file for complete search history.

(56) References Cited

U.S. PATENT DOCUMENTS

| | | | | |
|---|---|---|---|---|
| 5,434,767 A | * | 7/1995 | Batarseh | H02M 1/4208 323/222 |
| 5,636,106 A | * | 6/1997 | Batarseh | H02M 1/4208 323/222 |
| 9,812,864 B2 | * | 11/2017 | Temkin | H02J 3/28 |
| 2001/0048310 A1 | * | 12/2001 | Takahashi | G01R 31/346 324/551 |
| 2006/0077697 A1 | * | 4/2006 | Yang | H02M 3/33507 363/21.13 |
| 2007/0121328 A1 | | 5/2007 | Mondloch et al. | |
| 2010/0033110 A1 | | 2/2010 | Chien | |
| 2013/0099686 A1 | | 4/2013 | Ge et al. | |

(Continued)

FOREIGN PATENT DOCUMENTS

KR        10 0969817        7/2010

*Primary Examiner* — Gary L Laxton
*Assistant Examiner* — Sisay G Tiku
(74) *Attorney, Agent, or Firm* — Saile Ackerman LLC; Stephen B. Ackerman (57) ABSTRACT

A method and apparatus for limiting or preventing electromagnetic interferences in a switching converter are presented. In particular, a power circuit provided with an active electromagnetic interference filter is presented. There is an electromagnetic interference EMI reduction circuit for use with a switching converter. This EMI reduction circuit has a current source and is adapted to regulate a voltage across the current source to provide a current having a constant average value. The switching converter is adapted to provide a converter current, and the current source constant average value may be substantially equal to an average value of the converter current. The circuit has a variable resistance; and an adjuster adapted to adjust the variable resistance based on the converter current. The adjuster may have a comparator, which is adapted to compare a voltage value at a terminal of a transistor switch, and a reference value.

22 Claims, 8 Drawing Sheets

(56) References Cited

U.S. PATENT DOCUMENTS

| | | | | |
|---|---|---|---|---|
| 2013/0221862 | A1* | 8/2013 | Knoedgen | H05B 37/02 |
| | | | | 315/200 R |
| 2014/0055174 | A1* | 2/2014 | Knoedgen | H02M 1/36 |
| | | | | 327/109 |
| 2014/0210377 | A1* | 7/2014 | Knoedgen | H02M 3/33507 |
| | | | | 315/307 |
| 2014/0217886 | A1* | 8/2014 | Knoedgen | H05B 33/0848 |
| | | | | 315/51 |
| 2014/0252989 | A1* | 9/2014 | Knoedgen | H02M 3/33507 |
| | | | | 315/307 |
| 2015/0237693 | A1* | 8/2015 | Knoedgen | H05B 33/0815 |
| | | | | 315/224 |
| 2015/0382429 | A1* | 12/2015 | Knoedgen | G01R 19/0084 |
| | | | | 324/414 |
| 2017/0179815 | A1* | 6/2017 | Huang | H02M 1/44 |
| 2018/0048239 | A1* | 2/2018 | Adragna | H02M 3/33523 |
| 2018/0062404 | A1* | 3/2018 | Kesterson | H02J 7/0026 |
| 2018/0069478 | A1* | 3/2018 | Phadke | H02M 1/34 |
| 2018/0115252 | A1* | 4/2018 | Chang | H02M 3/33592 |

* cited by examiner

APPARATUS AND METHOD FOR LIMITING ELECTROMAGNETIC INTERFERENCES IN A SWITCHING CONVERTER

TECHNICAL FIELD

The present disclosure relates to a method and apparatus for limiting or preventing electromagnetic interferences in a switching converter. In particular, the present disclosure relates to a power circuit provided with an active electromagnetic interference filter.

BACKGROUND

Switched-mode power supply converters suffer from electromagnetic interferences (EMI) caused by the loading and unloading of the converter's inductor. The electronic industry applies a number of regulations which specify a maximum level of acceptable EMI. In these regulations a high-frequency inductive current must be kept below a certain value.

Prior art practice is based on a passive low-pass input filter provided at the input stage of the power converter. Such a passive filter is typically made of two serial inductors and a capacitor, and is therefore relatively cumbersome.

SUMMARY

It is an object of the disclosure to address one or more of the above-mentioned limitations. According to a first aspect of the disclosure, there is provided an electromagnetic interference EMI reduction circuit for use with a switching converter; the EMI reduction circuit comprising a current source and the EMI reduction circuit being adapted to regulate a voltage across the current source to provide a current having a constant average value.

Optionally the switching converter is adapted to provide a converter current, and the constant average value may be substantially equal to an average value of the converter current.

Optionally, the EMI reduction circuit comprises an electronic component having a variable resistance; and an adjuster adapted to adjust the variable resistance based on the converter current.

Optionally, the adjuster may be adapted to increase the variable resistance when the converter current is increasing and to decrease the variable resistance when the converter current is decreasing.

Optionally, the electronic component comprises a plurality of resistive elements.

Optionally, the electronic component comprises a transistor.

Optionally, the adjuster comprises a comparator coupled to the transistor, the comparator being adapted to compare a first value with a second value and to provide a signal to the transistor based on the comparison. For instance, the first value may be a voltage value at a terminal of the transistor, and the second value may be a reference value. The signal may be a saturated high or a saturated low value.

Optionally, the EMI reduction circuit comprises a rectifier, wherein the EMI reduction circuit forms part of the rectifier. For example, the rectifier may be a full wave rectifier.

According to a second aspect of the disclosure, there is provided a power circuit comprising a switching converter coupled to an electromagnetic interference EMI reduction circuit comprising a current source; the EMI reduction circuit being adapted to regulate a voltage across the current source to provide a current having a constant average value.

Optionally, the switching converter is adapted to provide a converter current, and wherein the constant average value is substantially equal to an average value of the converter current. For example, the converter current may be an inductor current.

Optionally, the power circuit comprises an electronic component having a variable resistance; and an adjuster adapted to adjust the variable resistance based on the converter current.

Optionally, the power circuit comprises a rectifier coupled to the converter, and wherein the EMI reduction circuit forms part of the rectifier.

Optionally, the EMI reduction circuit comprises a first transistor and a second transistor coupled to a controller.

Optionally, the controller and the first transistor form a first voltage controlled current source, and the controller and the second transistor form a second voltage controlled current source.

Optionally, the power circuit comprises a clamp circuit coupled to the switching converter.

Optionally, the clamp circuit comprises a diode coupled to ground via a first path comprising a transistor, and a second path comprising an energy storage element.

Optionally, the EMI reduction circuit is made at least in part based on a III/V semiconductor. For instance, the III/V semiconductor may be Gallium Nitride, GaN. For example, a transistor of the EMI reduction circuit may be a GaN transistor.

The power circuit according to the second aspect of the disclosure may comprise any of the features described above in relation to the EMI reduction circuit according to the first aspect of the disclosure.

According to a third aspect of the disclosure, there is provided a method of reducing electromagnetic interferences in a power circuit comprising a switching converter, the method comprising providing a current source, and regulating a voltage across the current source to provide a current having a constant average value.

Optionally, the switching converter is adapted to provide a converter current, and wherein the constant average value is substantially equal to an average value of the converter current.

Optionally, the method comprises providing an electronic component having a variable resistance; sensing the converter current; and adjusting the variable resistance based on the converter current.

Optionally, the method comprises increasing the variable resistance when the converter current is increasing and decreasing the variable resistance when the converter current is decreasing.

The method according to the third aspect of the disclosure may share features of the first and second aspects as described above.

BRIEF DESCRIPTION OF THE DRAWINGS

The disclosure is described in further detail below by way of example and with reference to the accompanying drawings, in which.

DESCRIPTION

Figure 1:
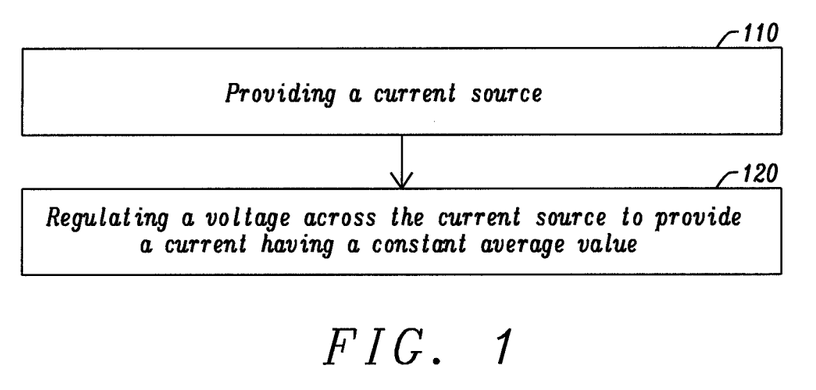
FIG. 1 is a flow chart of a method for reducing electromagnetic interferences EMI in a switching converter.

FIG. 1 is a flow chart of a method for reducing or preventing electromagnetic interferences in a switching converter. At step 110, a current source is provided. For example, the current source may be a voltage controlled current source. At step 120 a voltage across the current source is regulated to provide a current having a constant average value. For instance, the switching converter may be adapted to provide a converter current, and the constant average value may be substantially equal to an average value of the converter current.

This may be achieved by providing an electronic component having a variable resistance, sensing the converter current and adjusting the variable resistance based on the converter current. The converter current may be a high frequency current such as an inductor current. For example, the resistance may be increased when the electronic parameter is increasing and decreased when the electronic parameter is decreasing. As a result, electromagnetic interferences may be reduced. Using this approach, it is possible to reduce or eliminate electromagnetic interferences effectively, without unduly increasing the size of the power circuit.

Figure 2:
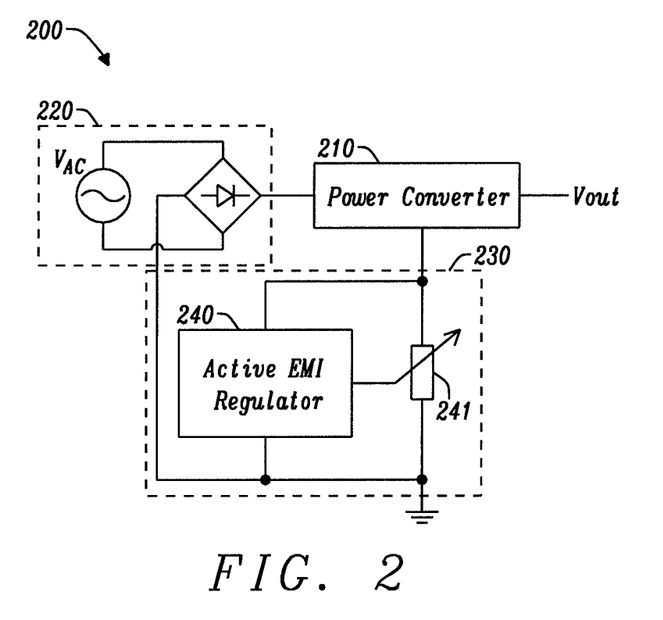
FIG. 2 is a diagram of a switching converter provided with an EMI regulator for implementing the method according to FIG. 1.

FIG. 2 illustrates a power circuit 200 provided with an electromagnetic interference EMI reduction circuit 230 for implementing the method according to FIG. 1. The power circuit 200 includes a switching converter 210 coupled to a mains power supply 220. The switching converter 210 has an input coupled to the mains power supply 220, and an output for providing an output voltage Vout to a load. The EMI reduction circuit 230 comprises an electronic component 241 having a variable resistance; and an adjuster, also referred to as EMI regulator 240 adapted to adjust the variable resistance based on an electrical parameter of the switching converter. The switching converter 210 is coupled to the ground via the electronic component 241. Depending on the application, the switching converter 210 may be an AC/DC converter or a DC/DC converter, and may be implemented using different topologies. For example, the switching converter may be a buck, a boost, a buck boost or a fly-back converter. Depending on the chosen topology, the switching converter may have a power switch coupled to an inductor for providing an inductor current.

The EMI reduction circuit 230 may be implemented in different locations of the circuit. For example, the EMI reduction circuit may be implemented as part of the mains power supply 220, or between the mains power supply 220 and the converter 210.

Figure 3:
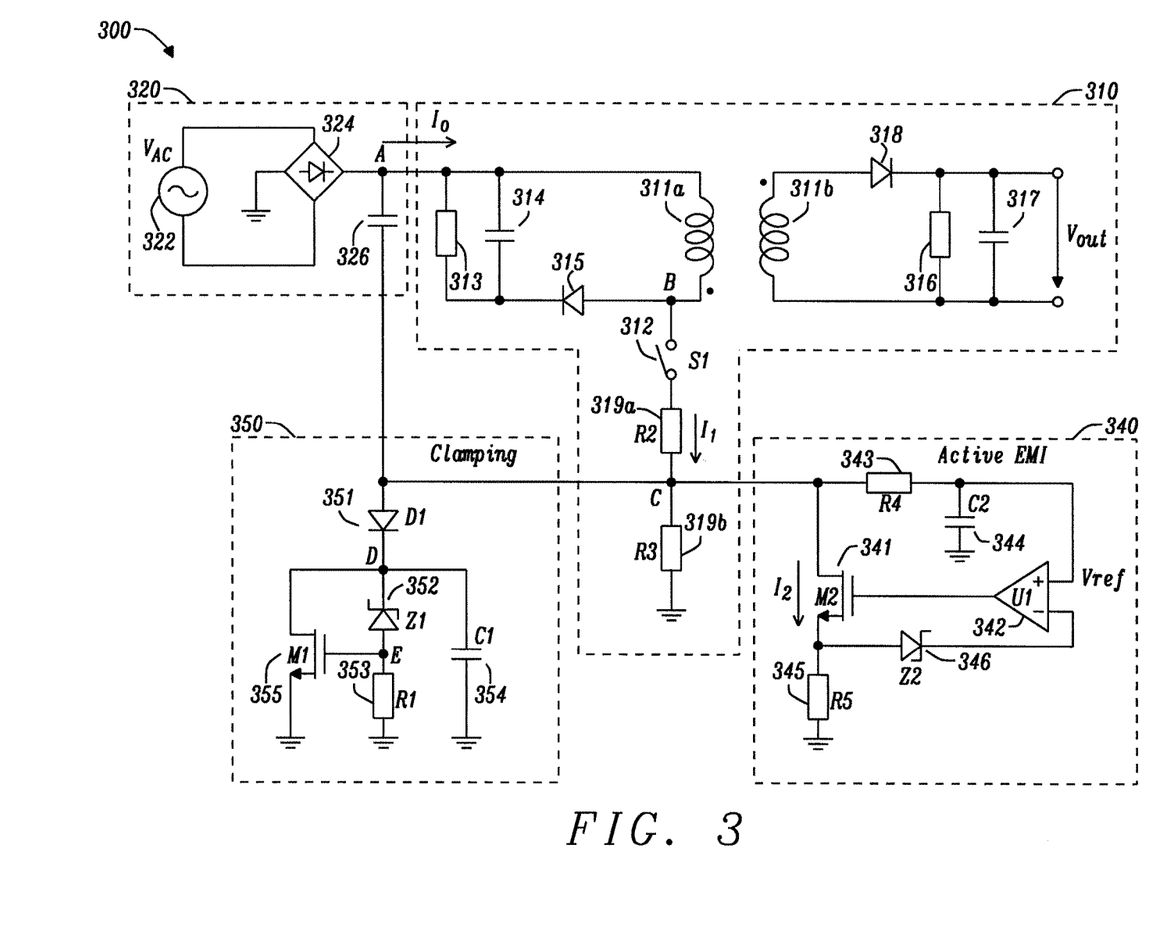
FIG. 3 is an exemplary embodiment of the diagram according to FIG. 2.

FIG. 3 shows an exemplary embodiment of the diagram of FIG. 2. In this example, the switching converter is a fly-back converter 310. A mains supply 320 includes an alternating voltage source 322 coupled to a rectifier 324 for providing a rectified voltage. The rectifier 324 is coupled to an output capacitor 326 at node A.

The switching converter 310 is coupled to the mains supply 320 at node A. The switching converter includes a transformer having a primary inductor 311a magnetically coupled to a secondary inductor 311b. The first inductor 311a has a first terminal coupled to a mains supply 320 at node A and a second terminal coupled to a power switch S1 312 at node B. The first inductor 311a is coupled in parallel with a first resistor 313 and a first capacitor 314. A first diode 315 is provided between node B and the first resistor 313. The secondary inductor 311b is coupled in parallel to a second resistor 316 and an output capacitor 317. A second diode 318 is provided between the secondary winding 311b and the output capacitor 317. The power switch S1 312 has a first terminal coupled to node B and a second terminal coupled to a ground via a potential divider. The potential divider is formed by resistance R2 319a coupled in series to resistance R3 319b at node C.

An electromagnetic interference EMI regulator 340 is coupled to switching converter 310 at node C to reduce or eliminate EMI. The regulator 340 includes a switch M2 341, a comparator U1 342, and a filter formed by a resistor R4 343 and a capacitor C2 344. The switch M2 341 has a first terminal, for example a drain terminal coupled to node C, a second terminal for example a source terminal coupled to a ground via a resistance R5 345, and a third terminal for example a gate terminal coupled to an output of the comparator 342. The comparator 342 has a first input, for example a non-inverting input coupled to the filter 343, 344, a second input, for example an inverting input coupled to the second terminal of the switch M2 via a Zener diode 346. The Zener diode 346 is used to implement an offset for the regulator. In this example the switching regulator 310 is coupled to the ground via resistance R2 319a, R3 319b, transistor M2 341 and resistance R5 345. Together these resistive elements form an electronic component having a variable resistance. The resistances R2 319a and R3 319b are optional.

Optionally, a clamp circuit 350 may be provided to maintain a ground connection with the switching converter. The clamp circuit 350, also referred to as inrush clamp, may be coupled to the switching converter 310 at node C and to the output of the mains supply at node A. The clamp circuit 350 includes a diode D1 351 coupled in series with a Zener diode Z1 352 and a resistor R1 353. A capacitor C1 354 is provided in parallel with the Zener diode 352 and the resistance R1 353. The capacitor C1 354 has a first terminal coupled to Z1 352 and D1 351 at a node D, and a second terminal coupled to ground. A clamping switch M1 355 has a first terminal, for example a drain terminal coupled to node D, a second terminal for example a source terminal coupled to the ground and a third terminal for example a gate terminal coupled to a node E between the Zener diode Z1 352 and the resistance R1 353.

Initially, the mains supply 320 is turned off, the voltage at node A is 0V, and the capacitor 326 is discharged. The transistor M2 341 is turned off (open). Upon start up, the mains supply 320 is turned on, the voltage at node A is high, for example 200V. The voltage at node C is high and the diode D1 is forward biased. The voltage at the gate terminal of M1 is above the threshold voltage of M1. The transistor M1 355 of the clamping circuit 350 is on (closed) and provides a ground connection. After a while the clamping circuit is disconnected and the power switch 312 also referred to as main switch is turned on and off alternately.

When the power switch 312 is closed, the primary winding 311*a* is connected to the ground. A current I1, also referred to as inductor current, flows through the primary inductor 311*a* and through the resistances R2 319*a* and R3 319*b*. The inductor current I1 in the primary winding 311*a* increases and a voltage induced in the secondary winding 311*b* is negative. As a result, the diode 318 is reverse-biased and energy is provided to the load by the output capacitor 317. When the power switch S1 312 is open, the primary winding 311*a* is not connected to the ground and cannot charge. The inductor current I1 in the primary winding 311*a* decreases and a voltage induced in the secondary winding 311*b* is positive. The diode 318 is forward-biased, allowing the transformer to provide energy to both the load and to the output capacitor 317, hence recharging it. Therefore, as the power switch 312 is turned on and off repeatedly, the inductor current I1 oscillates between maxima and minima. These amplitude variations cause electromagnetic interferences which can affect other parts of the circuit. For instance, electromagnetic interferences can induce amplitude modulation of the input current I0, also referred to as mains current. The EMI regulator 340 is provided to reduce amplitude variations, also referred to as ripples, of the inductor current I1. The voltage at node C is modulated by the ON/OFF cycle of the power switch S1 312. The EMI regulator 340 functions as a current source and is used to regulate the voltage at node C. Using a numerical example, at start up the voltage Vc at node C may be 1V. When the power switch S1 312 is turned ON Vc increases for instance up to 1.5V. When S1 is turned off the EMI regulator pulls the voltage Vc down to 1V. Therefore, the EMI regulator stabilises the voltage Vc around a certain value, for instance 1V.

The EMI regulator 340 provides a current I2 having a constant average value. The average value of the current I2 may be equal to the average value of the current I1. For example, assuming that the transistor M2 operates with a 50% duty cycle, I2 may be 2 A when M2 is ON and 0 A when M2 is OFF, corresponding to a constant average value of 1 A.

The transistor M2 is operated to keep the average value of I2 constant. The conductivity of the transistor M2 341 is controlled by the comparator 342. The low pass filter 343, 344 provides a DC reference voltage Vref corresponding to an average voltage of the voltage at node C. The comparator 342, compares a voltage across the resistance R5 with the reference voltage Vref, and output an error signal to the gate of M2. The error signal may be a saturated high or a saturated low value. When a large current flows through R5, the voltage V(R5) is greater than Vref and the comparator provides an error signal to reduce the conductivity of the switch M2. On the contrary, when a small current flows through R5, the voltage V(R5) is less than Vref and the comparator provides an error signal to increase the conductivity of the transistor M2 341. The conductivity between the drain and source terminals of M2 may be varied by adjusting a voltage provided at the gate terminal of M2. Considering a numerical example, if the inverting and the non-inverting inputs of the comparator receive both 1V, the comparator may provide a gate voltage of 1V. This corresponding to a current I2 defined by the gate voltage/R5. The transistor M2 is operated to keep the average value of I2 constant. As a result, the amplitude variation of the inductor current I1 is reduced, hence lowering electromagnetic interferences.

The clamping switch M1 355 should be able to sustain a current of several Amperes for a short time. For example, the clamping switch M1 355 may have a resistance on value Rds_on of about 1 Ohm, calculated assuming a current of 5 A and a voltage Vds of 5V. The optional resistance R3 319*b* may be used to tune the operating range of the EMI regulator 340 and of the clamping circuit 350.

Figure 4:
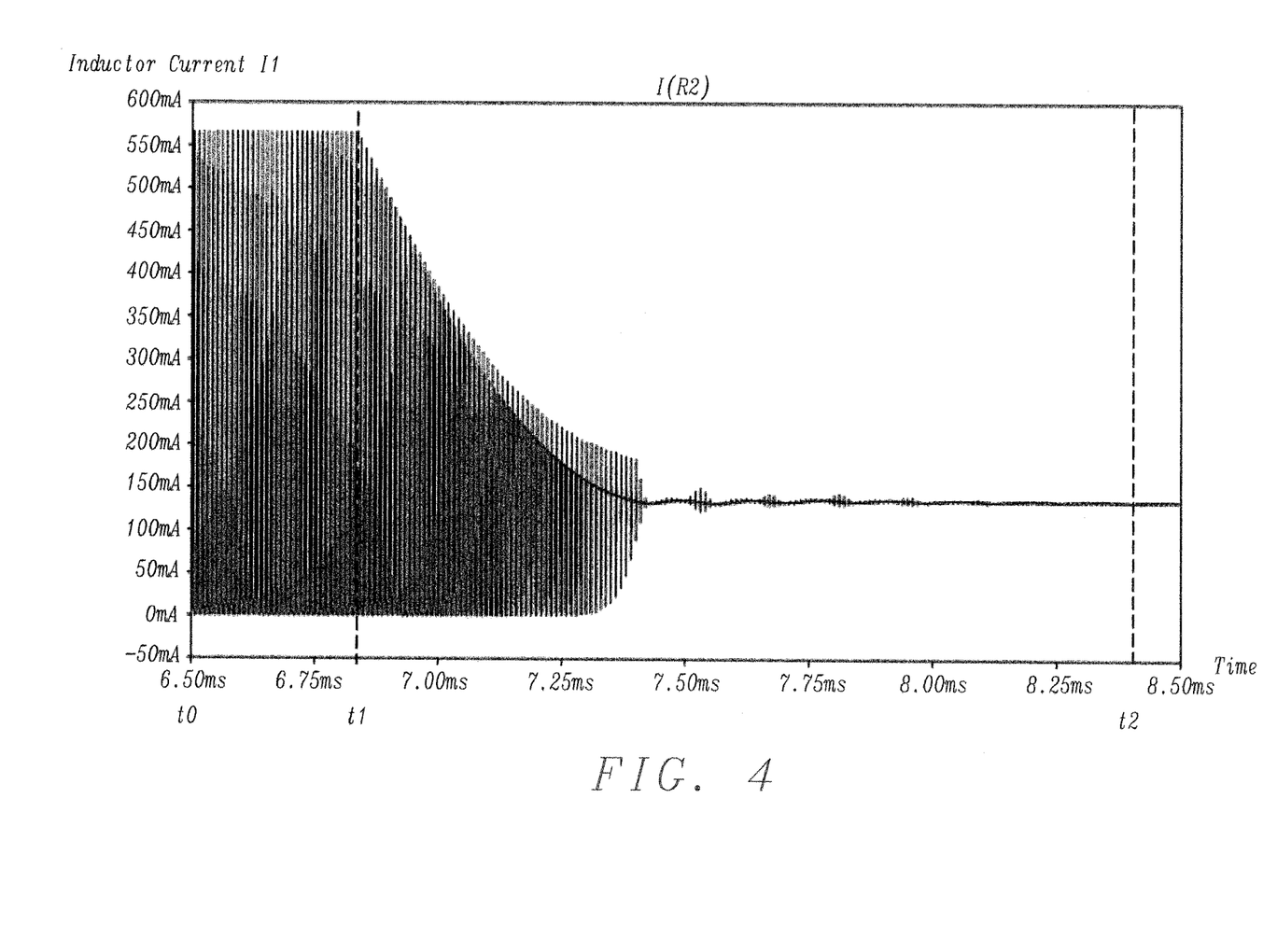
FIG. 4 is a time-dependent simulation of an inductor current provided by the circuit of FIG. 3.

FIG. 4 is a time-dependent simulation of the inductor current I1 flowing through resistance R2 of the circuit of FIG. 3. Initially at time t0, the switching converter operates with the EMI regulator 340 being disabled. The oscillations of the current I1 have large amplitude fluctuations. At time t1, the EMI regulator 340 is activated, and the ripples start to decrease to reach a steady state value at time t2.

Figure 5:
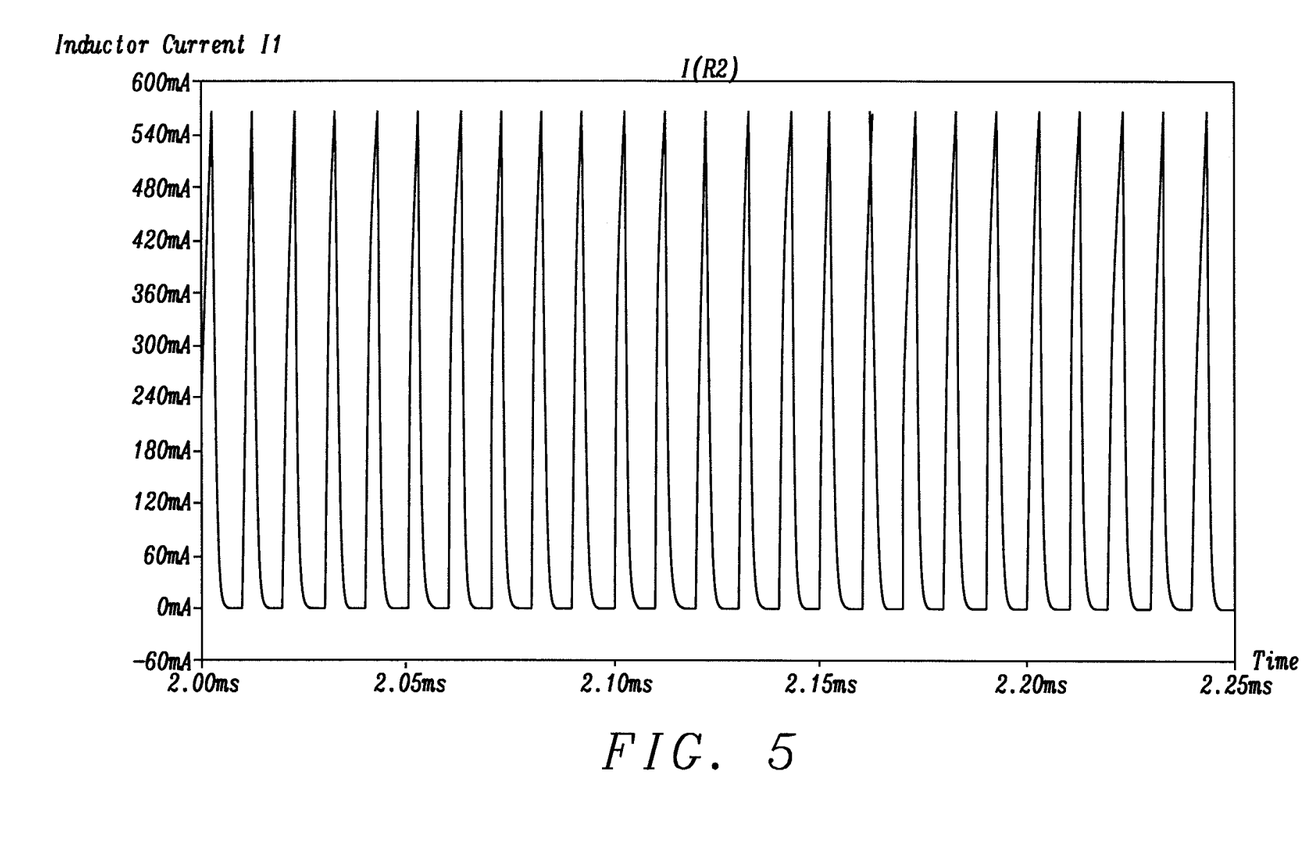
FIG. 5 is a portion of the inductor current of FIG. 4 when the EMI regulator is disabled.

FIG. 5 shows a narrow window of 250 µs before time t1, when the EMI regulator is disabled. The current I1 has a peak value of about 570 mA.

Figure 6:
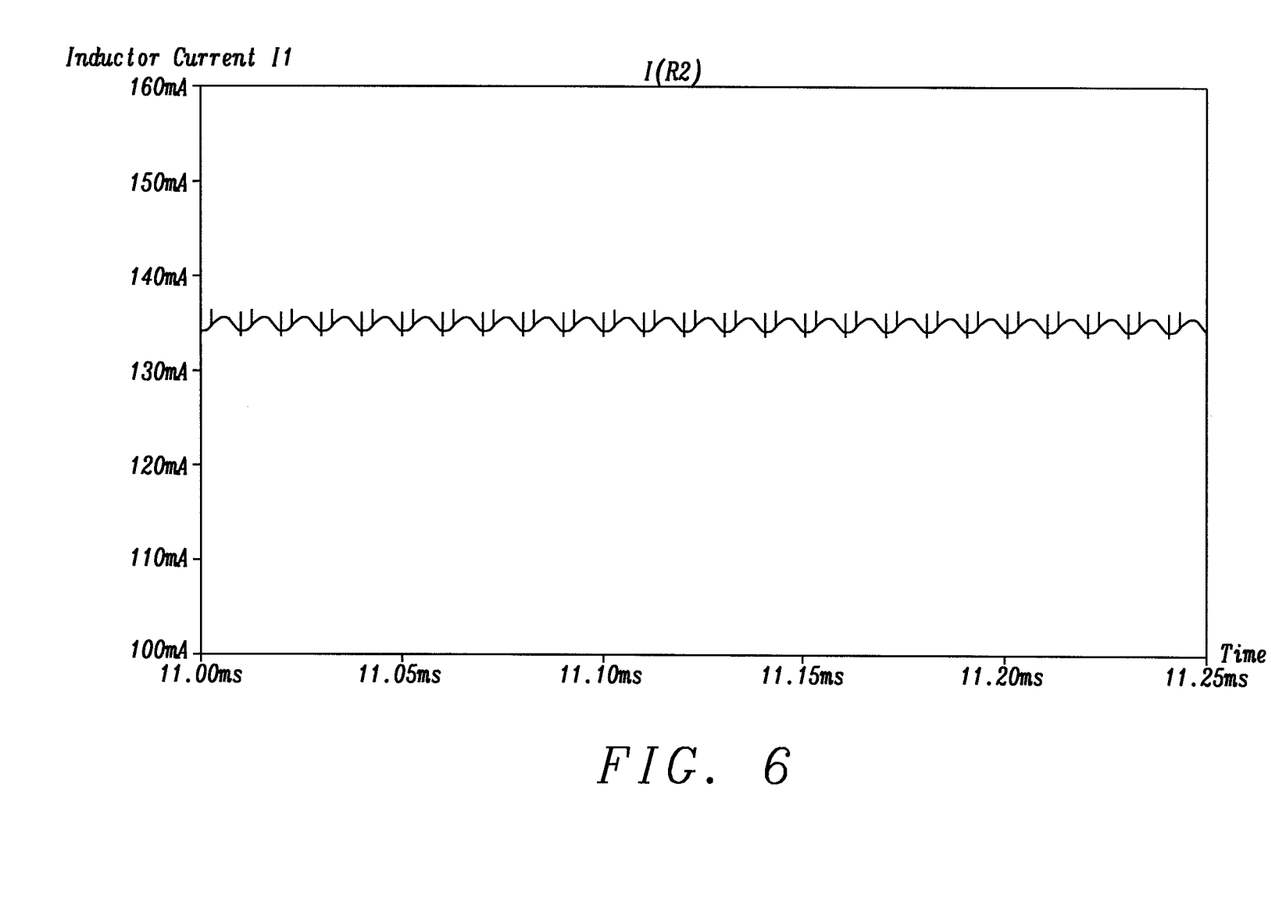
FIG. 6 is a portion of the inductor current of FIG. 4 when the EMI regulator is enabled.

FIG. 6 shows a narrow window of 250 µs after time t2, when the EMI regulator is enabled. In this case the current I1 has a peak value of about 2 mA. This corresponds to a noise reduction of about −49 Decibels (dB).

Figure 7:
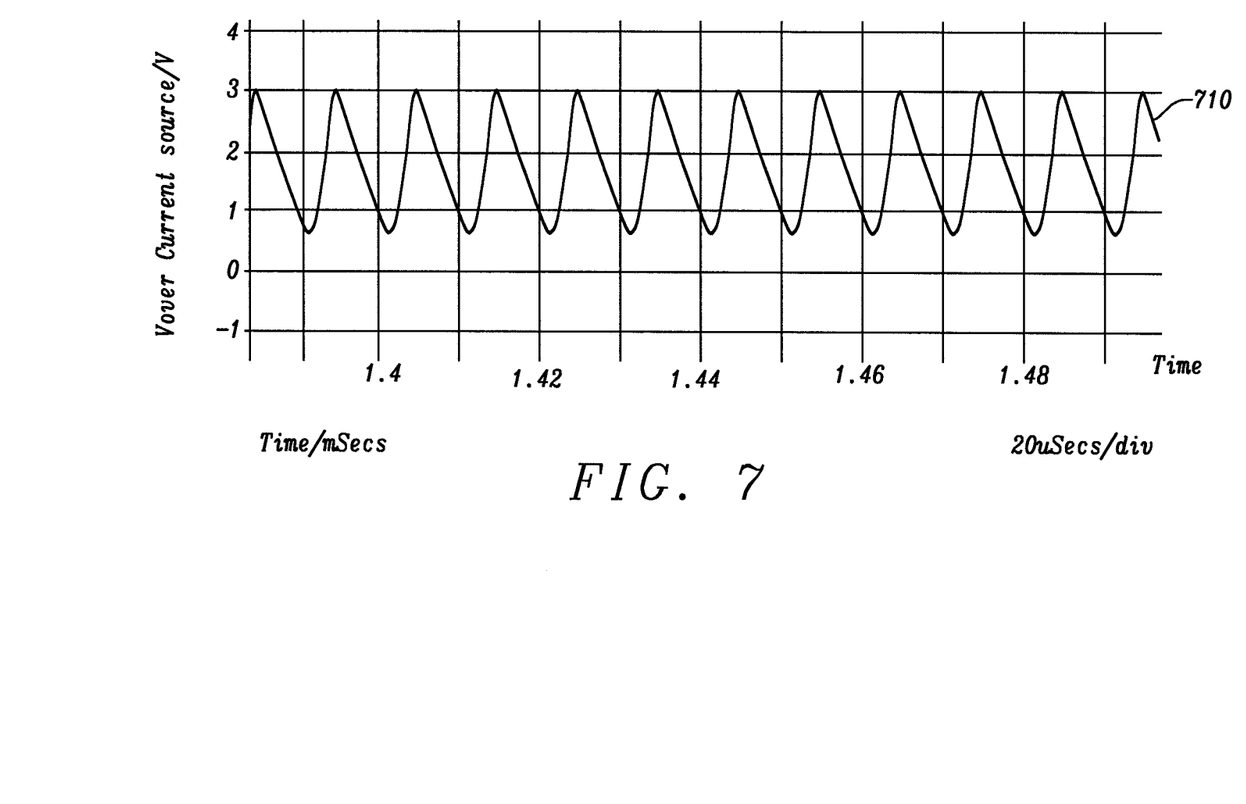
FIG. 7 is a simulation of a voltage across the current of the circuit according to FIG. 3.
Figure 8:
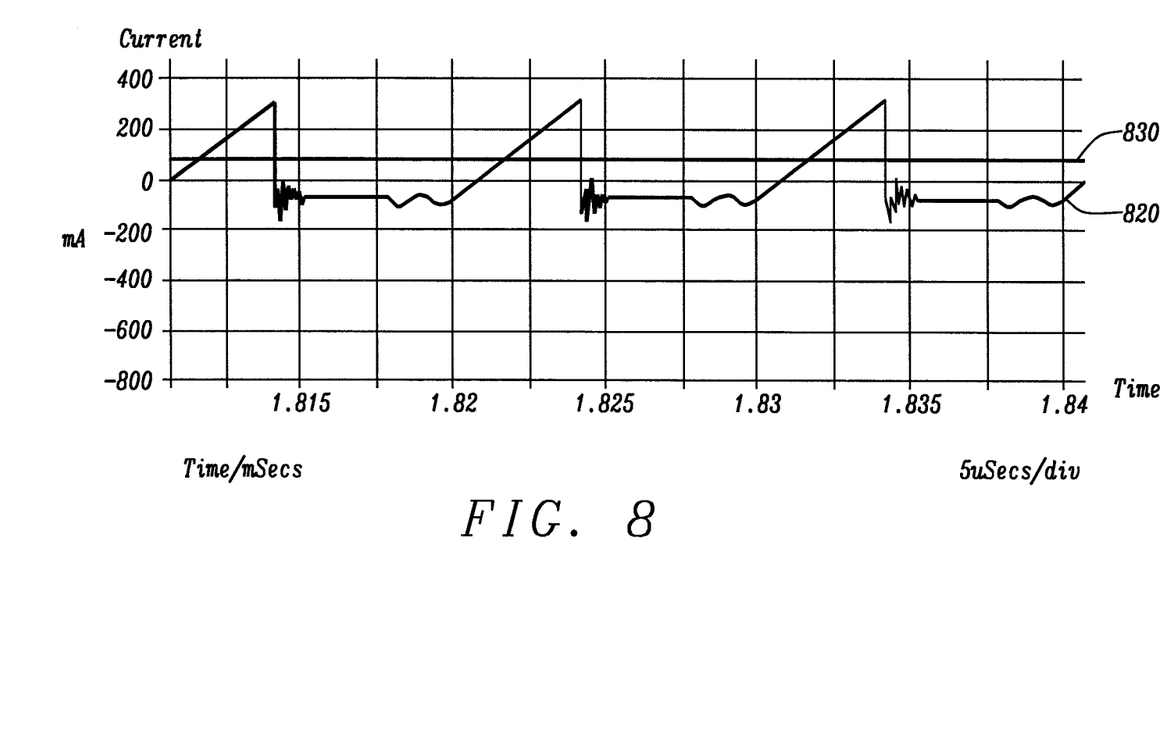
FIG. 8 is a simulation of the input current and the converter current of the circuit of FIG. 3.

FIGS. 7 and 8 are simulations results for the voltage Vc at node C, 710, the converter current I1 820 and the input current I0 830. The voltage at node C should be as low as possible so as to reduce power losses. When the EMI regulator is activated, the input current I0 830 provided by the mains supply remains constant over time. As a result, there is no need for an additional smoothing inductor for damping current oscillations due to the switching of the mains switch S1 312. If the converter changes its average output current, then the current source has to change the value of the constant current it generates.

Figure 9:
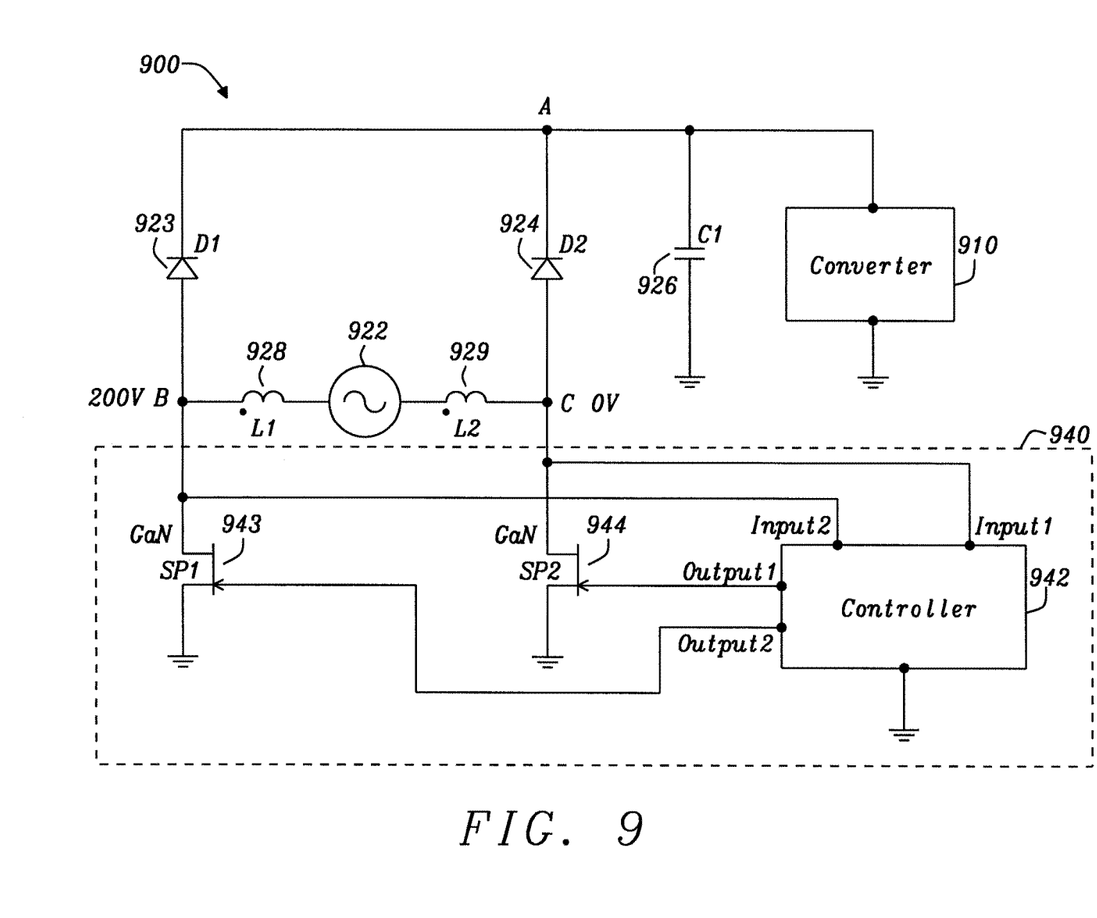
FIG. 9 is a diagram of another switching converter provided with an EMI regulator for implementing the method according to FIG. 1.

FIG. 9 is a diagram of another switching converter provided with an EMI regulator for implementing the method according to FIG. 1. In the circuit 900, an EMI regulator 940 is provided as part of the mains supply 320. The mains supply is provided by a full bridge rectifier formed by first and second diodes 923 and 924, and first and second transistors 943 and 944. An alternating voltage supply 922 is coupled to the first diode 923 and to the first transistor 943 at node B. The alternating voltage supply 922 is coupled to the second diode 924 and to the second transistor 944 at node C.

An output capacitor C1 926 is coupled to the first and the second diodes at node A. The alternating voltage supply 922 may be coupled to nodes B and C via a first inductor L1 928 and a second inductor L2 929 respectively.

The EMI regulator 940 includes a controller 942 and the first and second transistors 943 and 944. The controller 942 has two inputs and two outputs. The first and second inputs are coupled to nodes C and B respectively. The first output is coupled to the gate terminal of the second transistor 944. The second output is coupled to the gate terminal of the first transistor 943.

The controller 942 may be implemented by a first control circuit between input 1 and output 1 and a second control circuit between input 2 and output 2. A control circuit may be implemented in a similar fashion as circuit 340 described with respect to FIG. 3, in which the comparator 342 outputs a control signal to the transistor M2. The controller 942 may be a CMOS controller and the transistors 943 and 944 may be GaN transistors. The controller 942 and first transistor 943 provide a first voltage controlled current source, while the controller 942 and the second transistor 944 provide a second voltage controlled current source.

In operation, the first transistor 943 regulates the voltage at node B while the second transistor 944 regulates the voltage at node C. Compared with the circuit 300 of FIG. 3, the circuit 900 of FIG. 9 allows to lower the voltage modulation across the current source, and therefore to improve power efficiency by reducing power losses. In a numerical example, if the diodes D1 923 and D2 924 have a voltage drop of 0.7 V, and considering a current of 200 mA, then the power loss per diode would be 140 mW. If the current source has a voltage drop of 500 mV, then the losses in the current source would be 100 mW. The circuit 900 can be modified by replacing the diodes D1 and D2 with two transistors.

Any of the circuit described above with reference to FIGS. 2, 3 and 9 may be implemented wholly, or in part based on III/V semiconductors such as Gallium Nitride, GaN. Transistors based on III/V semiconductors such as Gallium Nitride, GaN, display a relatively low on-resistance and can achieve higher switching speed compared to their silicon-based counterpart. As such, GaN transistors are well suited for the design of fast power switching converters.

A skilled person will appreciate that variations of the disclosed arrangements are possible without departing from the disclosure. For instance, the power circuit described above is not limited to a fly-back topology and could be applied to any other type of switching converter such as buck or buck boost converters. Accordingly, the above description of the specific embodiment is made by way of example only and not for the purposes of limitation. It will be clear to the skilled person that minor modifications may be made without significant changes to the operation described.

What is claimed is:

1. An electromagnetic interference EMI reduction circuit for use with a switching converter for providing a converter current; the EMI reduction circuit comprising a current source and wherein the EMI reduction circuit regulates a voltage across the current source to provide a current having a constant average value equal to an average value of the converter current.

2. The EMI reduction circuit as claimed in claim 1, comprising an electronic component having a variable resistance; and an adjuster to adjust the variable resistance based on the converter current.

3. The EMI reduction circuit as claimed in claim 2, wherein the adjuster increases the variable resistance when the converter current is increasing and decreases the variable resistance when the converter current is decreasing.

4. The EMI reduction circuit as claimed in claim 2, wherein the electronic component comprises a plurality of resistive elements.

5. The EMI reduction circuit as claimed in claim 4, wherein the electronic component comprises a transistor.

6. The EMI reduction circuit as claimed in claim 5, wherein the adjuster comprises a comparator coupled to the transistor, wherein the comparator compares a first value with a second value and to provide a signal to the transistor based on the comparison.

7. The EMI reduction circuit as claimed in claim 1, comprising a rectifier, wherein the EMI reduction circuit forms part of the rectifier.

8. A power circuit comprising a switching converter for providing a converter current, the switching converter being coupled to an electromagnetic interference EMI reduction circuit comprising a current source; wherein the EMI reduction circuit regulates a voltage across the current source to provide a current having a constant average value equal to an average value of the converter current.

9. The power circuit as claimed in claim 8, comprising an electronic component having a variable resistance; and an adjuster to adjust the variable resistance based on the converter current.

10. The power circuit as claimed in claim 8, comprising a clamp circuit coupled to the switching converter.

11. The power circuit as claimed in claim 10, wherein the clamp circuit comprises a diode coupled to ground via a first path comprising a transistor, and a second path comprising an energy storage element.

12. The power circuit as claimed in claim 8, wherein the EMI reduction circuit is made at least in part based on a III/V semiconductor.

13. The power circuit as claimed in claim 8, wherein the power circuit comprises a rectifier coupled to the converter, and wherein the EMI reduction circuit forms part of the rectifier.

14. The power circuit as claimed in claim 8, wherein the EMI reduction circuit comprises a first transistor and a second transistor coupled to a controller.

15. The power circuit as claimed in claim 14, wherein the controller and the first transistor form a first voltage controlled current source, and the controller and the second transistor form a second voltage controlled current source.

16. A method of reducing electromagnetic interferences in a power circuit comprising a switching converter for providing a converter current, the method comprising the steps of:
providing a current source, and
regulating a voltage across the current source to provide a current having a constant average value equal to an average value of the converter current.

17. The method as claimed in claim 16 further comprising the steps of:
providing an electronic component having a variable resistance; sensing the converter current; and adjusting the variable resistance based on the converter current.

18. The method as claimed in claim 17, further comprising the steps of:
increasing the variable resistance when the converter current is increasing and
decreasing the variable resistance when the converter current is decreasing.

19. The method as claimed in claim 17, wherein the electronic component comprises a plurality of resistive elements.

20. The method as claimed in claim 19, wherein the electronic component comprises a transistor.

21. The method as claimed in claim 20, wherein the adjuster comprises a comparator coupled to the transistor, wherein the comparator compares a first value with a second value and provides a signal to the transistor based on the comparison.

22. The method as claimed in claim 16, comprising a rectifier, wherein the EMI reduction circuit forms part of the rectifier.

* * * * *